United States Patent
Fujishita et al.

(10) Patent No.: US 6,225,562 B1
(45) Date of Patent: May 1, 2001

(54) SEALANT FOR FILLING GROMMET, METHOD FOR SEALING A WIRE HARNESS USING THE SEALANT AND SEALING STRUCTURE

(75) Inventors: Mikio Fujishita; Takahiro Kato, both of Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/498,020

(22) Filed: Feb. 4, 2000

Related U.S. Application Data

(63) Continuation-in-part of application No. 08/845,482, filed on Apr. 25, 1997, now abandoned.

(30) Foreign Application Priority Data

Apr. 26, 1996 (JP) .................................................. 8-107970

(51) Int. Cl.[7] .................................................. H02G 15/22
(52) U.S. Cl. .................................. 174/76; 174/152 G
(58) Field of Search ................................. 174/76, 72 A, 174/65 SS, 65 G, 152 G, 153 G

(56) References Cited

U.S. PATENT DOCUMENTS 4,476,276   10/1984  Gasper .................. 524/500

4,943,685 * 7/1990  Reynaert ................ 174/76 X

FOREIGN PATENT DOCUMENTS

| 901070 | 7/1949 | (DE) . |
| 1-58223 | 4/1989 | (JP) . |
| 6-351133 | 12/1994 | (JP) . |
| 7-221468 | 8/1995 | (JP) . |
| 8-116615 | 5/1996 | (JP) . |
| 9-48966 | 2/1997 | (JP) . |

* cited by examiner

Primary Examiner—Dean A. Reichard
Assistant Examiner—Chau N. Nguyen
(74) Attorney, Agent, or Firm—Oliff & Berridge, PLC

(57) ABSTRACT

A sealing agent is filled into gaps between adjacent groups of electric wires and gaps between the groups of the electric wires and an inner peripheral surface of a grommet. The sealing agent is of a two-liquid reactive hardening type and includes a main agent and a hardening agent, the main agent containing a viscosity depressant mixed with hardening accelerators at a predetermined ratio. The sealing agent has a viscosity of 200 cps–500 cps in a grommet-to-wire assembly environment and gels in three to seven minutes. The mixing weight ratio between the main agent and the hardening agent of the sealing agent is set to a range of 5.5:1–1:1. The main agent includes polyether polyol, triethanolamine and dibutyltin dilaurate both used as the hardening accelerators, a low-molecular weight aromatic hydrocarbon used as a viscosity depressant, and an anti-oxidant. The hardening agent includes polyisocyanate.

24 Claims, 5 Drawing Sheets

SEALANT FOR FILLING GROMMET, METHOD FOR SEALING A WIRE HARNESS USING THE SEALANT AND SEALING STRUCTURE

This is a Continuation-in-Part of application Ser. No. 08/845,482 filed Apr. 25, 1997 now abandoned. The entire disclosure of the prior application(s) is hereby incorporated by reference herein in its entirety.

BACKGROUND OF THE INVENTION

1. Field of the Invention

The present invention relates to a sealing agent to be filled into a grommet, a method of sealing a wire harness with the sealing agent, and a sealing construction of the wire harness. More particularly, in order to waterproof the wire harness reliably, the present invention is intended to allow the sealing agent to have a high degree of penetration performance to fill gaps between groups of electric wires of the wire harness inserted into the grommet. Further, the present invention is intended to harden the sealing agent in a short period of time to accomplish a waterproof operation with high efficiency.

2. Description of Related Art

According to the conventional art, a wire harness W/H is positioned by penetrating it through a through-hole formed on a car body panel (P), as shown in FIG. 5: An operator inserts the wire harness W/H into a grommet 1 made of rubber to bring it into close contact with a small-diameter section 1a of the grommet 1. An engaging groove 1c formed on the peripheral surface of a large-diameter section 1b of the grommet 1 fits into the peripheral wall of a through-hole 2 of the car body panel (P), and a lip 1d formed on a part of the grommet 1 to be installed on the car body is brought into close contact with the car body panel (P). In this manner, the operator seals the wire harness W/H.

In inserting the grommet-installed wire harness W/H into an engine room and placing it at position, it is necessary to waterproof the wire harness W/H. To this end, referring to FIG. 6, inside the grommet, electric wires (w) constituting the wire harness W/H are not tied into a bundle with a tape but separated from each other. In this state, a sealing agent 3 is injected from the large-diameter section 1b of the grommet 1 into the gaps between the adjacent electric wires (w) and the gaps between the electric wires (w) and the inner peripheral surface of the grommet 1.

The above-described conventional art has, however, a problem that the sealing agent 3 is incapable of penetrating readily into all the gaps, because the gaps between the adjacent electric wires (w) are small and in addition, the viscosity of the conventional sealing agent 3 is as high as 1,000 cps–2,000 cps.

A sealing agent having a low viscosity may be used to improve its flowability and hence its penetration property. But the problem is that it takes more than 15 minutes to harden. Thus, in that period of time, the sealing agent 3 flows downward from the grommet-installing region of the wire harness and is thus incapable of completely filling the gaps between the adjacent electric wires (w) inside the grommet.

SUMMARY OF THE INVENTION

The present invention has been made in view of the above-described problems. It is accordingly an object of the present invention to provide a sealing agent having a low viscosity and improved penetration properties.

It is another object of the present invention to prevent the sealing agent from flowing downward from a grommet-installing region of a wire harness and further, reduce a sealing operation period of time by providing a sealing agent which hardens in a short period of time.

To achieve the above objects, a sealing agent of the present invention is filled into gaps between adjacent groups of electric wires and gaps between the groups of the electric wires and an inner peripheral surface of a grommet. The sealing agent is a two-liquid reactive hardening type and includes a hardening agent and a main agent containing a viscosity depressant mixed in a predetermined ratio with hardening accelerators. The sealing agent has a viscosity of 200 cps (centipoise)–500 cps in a grommet-to-wire assembly environment, such as an environment that has a temperature of from about 10° C. to about 40° C. and gels in three to seven minutes.

The mixing weight ratio between the main agent and the hardening agent of the sealing agent may be set to a range of 5.5:1–1:1. The main agent includes polyether polyol, triethanolamine and dibutyltin dilaurate both used as the hardening accelerators, a low-molecular weight aromatic hydrocarbon used as a viscosity depressant, and an anti-oxidant. The hardening agent includes polyisocyanate.

The sealing agent of the present invention has a viscosity in the range of 200 cps–500 cps in a grommet-to-wire assembly environment, such as an environment that has a temperature of from about 10° C. to about 40° C. More favorably, the viscosity of the sealing agent may be set to 300 cps, whereas the viscosity of a conventional agent is 1,000–2,000 cps. That is, the viscosity of the sealing agent is about ⅓–⅙ as low as that of the conventional one. Thus, the sealing agent of the present invention has a higher degree of flowability than the conventional one. Therefore, the sealing agent is capable of sufficiently penetrating into gaps between adjacent groups of electric wires and gaps between the groups of the electric wires and the inner peripheral surface of the grommet. The gelling time period is set to three–seven minutes. More favorably, it may be set to five minutes. Thus, the sealing agent gels before it flows downward from the grommet-installing region. Thus, there is no possibility that the sealing agent flows downward from the region which should be filled with the sealing agent. Further, the part of the groups of the electric wires positioned below the grommet-installing region is tightened to minimize the gaps between the groups of the electric wires. Therefore, the sealing agent being gelled can be prevented from flowing downward from the region which should be filled with the sealing agent.

According to another aspect, a method of sealing a wire harness according to the present invention comprises: mounting a large number of electric wires constituting the wire harness on a spacer for spacing groups of the electric wires at regular intervals so that a sealing agent fills into gaps between the groups of the electric wires; inserting the wire harness into a rubber grommet having a small-diameter section to be brought into close contact with a peripheral surface of the wire harness and a large-diameter section having a part to be mounted on a car body; bringing the spacer installed on the wire harness into close contact with an inner peripheral surface of the grommet; winding a tape around a leading end of the small-diameter section and the peripheral surface of the wire harness to fix the grommet to the wire harness at a predetermined position thereof; and injecting a sealing agent into the erected grommet from an opening positioned at an upper end of the large-diameter section, with the large-diameter section turned at an upper side of the grommet to fill the gaps between the groups of the electric wires and gaps between the groups of the electric wires and the inner peripheral surface of the grommet with the sealing agent.

The sealing agent has a low viscosity and a high flowability, thus penetrating sufficiently into narrow gaps between the adjacent groups of the electric wires without widening the gaps. To further ensure that the gaps are filled with the sealing agent, the spacer is installed in the grommet, thus waterproofing the wire harness securely.

According to another aspect of the invention, there is provided a sealing construction of a wire harness in which gaps between groups of electric wires and gaps between the groups of the electric wires and an inner peripheral surface of a grommet are filled with a sealing agent. The sealing agent is of a two-liquid reactive hardening type and includes a hardening agent and a main agent containing a viscosity depressant mixed in a predetermined ratio with hardening accelerators. The sealing agent has a viscosity of 200 cps–500 cps in a grommet-to-wire assembly environment, such as an environment that has a temperature of from about 10° C. to about 40° C. and gels in three to seven minutes.

According to still another aspect of the present invention, there is provided a sealing construction for waterproofing a wire harness having a plurality of wires within a grommet, comprising a grommet body having a small-diameter section, a large-diameter section and a transition section between the small and large-diameter sections, the plurality of wires being closely spaced in the small-diameter section and separated in the large-diameter section and a sealing agent disposed in the large-diameter section to fill gaps between the separated wires, the sealing agent having a viscosity in the range of about 200 cps to about 500 cps in a grommet-to-wire assembly environment, such as an environment that has a temperature of from about 10° C. to about 40° C.

According to yet another aspect of the present invention, there is provided a method for constructing a waterproof grommet. The method includes inserting a wire harness having a plurality of wires into a grommet body having a flared end; injecting a sealing agent having a viscosity of between about 200 cps and about 500 cps in a grommet-to-wire assembly environment, such as an environment that has a temperature of from about 10° C. to about 40° C. into the flared end; and gelling the sealing agent in a time period of about three to about seven minutes.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF PREFERRED EMBODIMENTS

A first embodiment of the present invention will be described below with reference to drawings.

Figure 1:
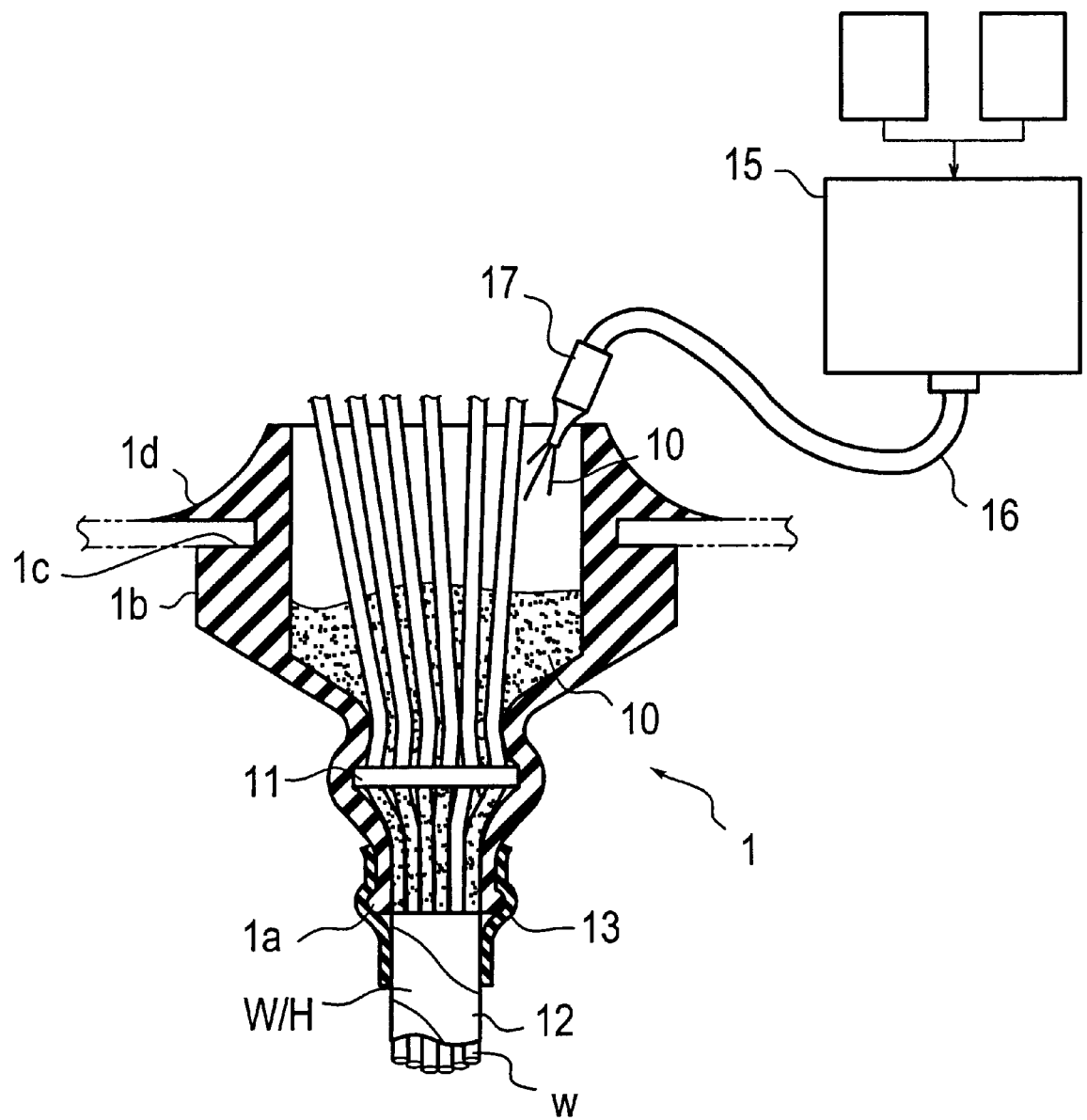
FIG. 1 is a sectional view showing a sealing construction of a wire harness at a grommet-installing part thereof according to a first embodiment.

FIG. 1 is a sectional view showing the sealing construction of a wire harness at a grommet-installing part thereof according to the first embodiment.

Figure 5:
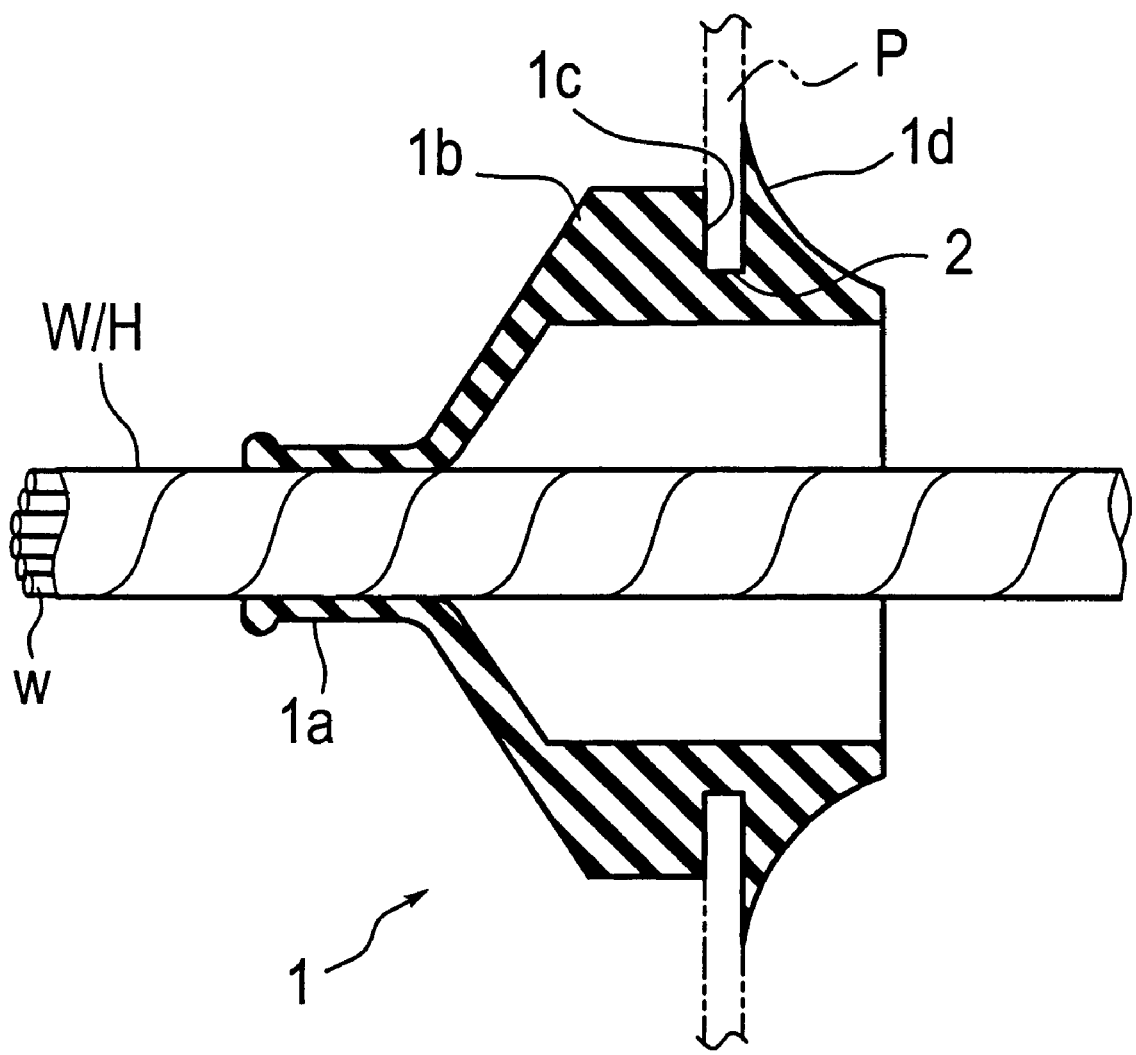
FIG. 5 is a sectional view showing an example of a conventional sealing construction of a wire harness at a grommet-installing part thereof.
Figure 6:
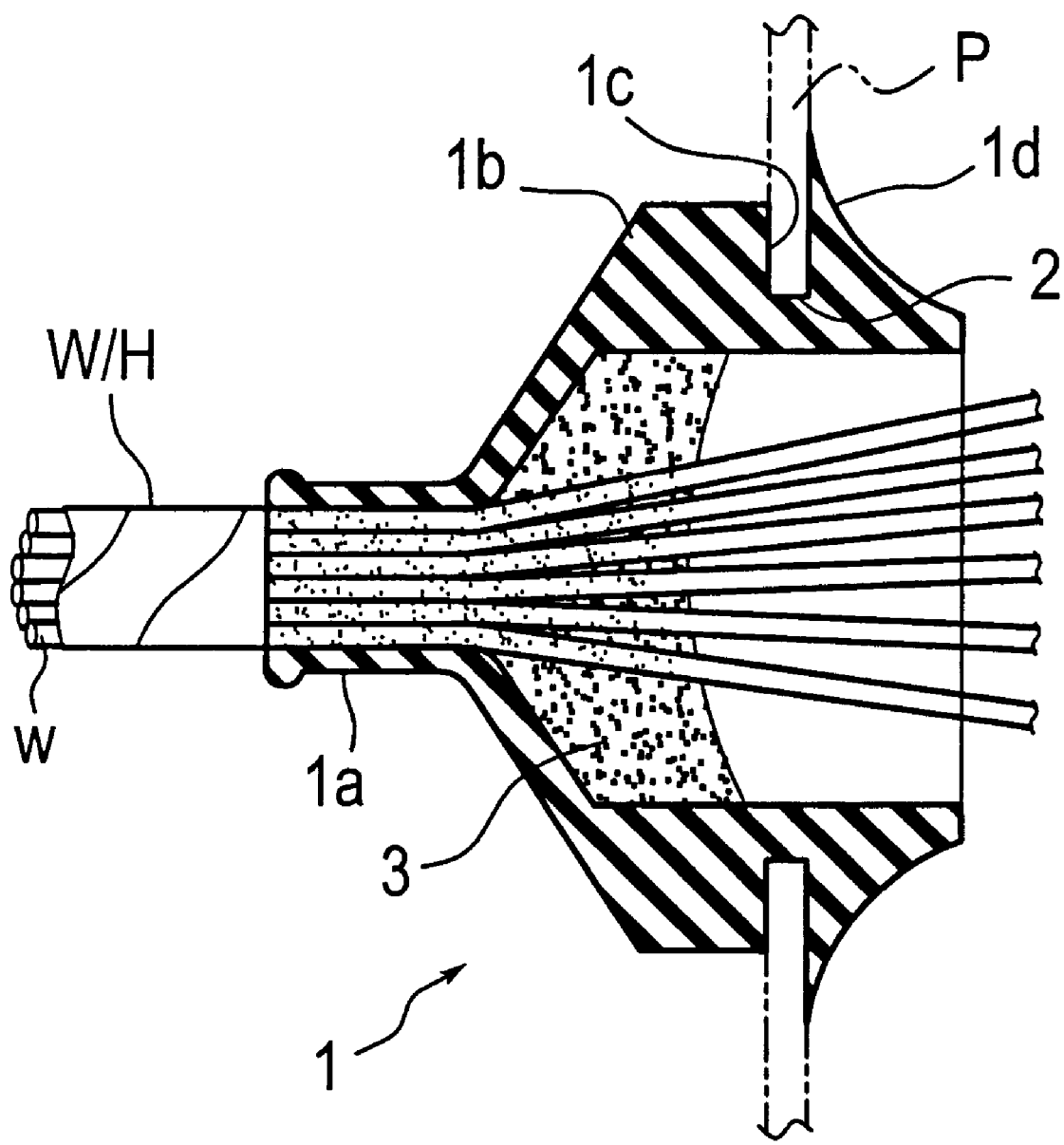
FIG. 6 is a sectional view showing another example of a conventional sealing construction of a wire harness at a grommet-installing part thereof.

The grommet 1 has a shape similar to that of the conventional one shown in FIG. 5. A large number of groups of electric wires (w) constituting a wire harness W/H are inserted into a small-diameter cylindrical section 1a of the grommet 1 made of rubber by bringing the small-diameter cylindrical section 1a into close contact with the peripheral surfaces of the groups of the electric wires (w) held by a spacer 11, and a tape 12 is tightly wound around a part of the groups of electric wires (w) positioned in the vicinity of the lower end of the small-diameter cylindrical section 1a so that gaps between the adjacent groups of the electric wires (w) are narrowed to the smallest possible extent.

As shown in FIG. 1, a sealing agent 10 is injected into the grommet 1 from an opening of a large-diameter section 1b having a part to be installed on a car body, so that the sealing agent 10 flows downward from the large-diameter section 1b to the small-diameter cylindrical section 1a. Because the part, of the groups of the electric wires (w), located at the lower part of the grommet 1 is tightened with the tape 12, the sealing agent 10 can be prevented from flowing downward from the lower part of the grommet 1.

The sealing agent 10 is a two-liquid reactive hardening agent including a main agent and a hardening agent. The main agent is a mixture of a viscosity depressant and hardening accelerators mixed with each other at a predetermined wt %. The viscosity of the sealing agent 10 is set to 200 cps–500 cps in a grommet-to-wire assembly environment in which, for example, a worker assembles grommets to wires while, for example, assembling and/or installing an automotive wiring harness. Such an environment normally has a temperature of from about 10° C. to about 40° C. More favorably, the viscosity of the sealing agent 10 is 300 cps. The gelling time period is set to three–seven minutes. More favorably, the gelling time period is set to five minutes. The complete hardening period of time of the sealing agent 10 is set to 10 minutes.

The mixing weight ratio between the main agent and the hardening agent is set to the range of 5.5:1–1:1. More favorably, it is set to 4:1. The main agent includes polyether polyol; triethanolamine and dibutyltin dilaurate, both used as the hardening accelerators; and a low-molecular weight aromatic hydrocarbon used as the viscosity depressant. The main agent also contains an anti-oxidant. The hardening agent includes polyisocyanate.

The low-molecular weight aromatic hydrocarbon viscosity depressant comprises or consists of, for example, toluene formaldehyde polymer and lubricating oil. An exemplary polyether polyol main agent is expressed by formula (I):

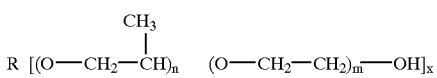

(I)

wherein the molecular weight of formula (I) is from about 1000 to about 4000.

Cross-linking may be created by the following exemplary chemical reactions, as shown in Table 1.

TABLE 1

R—NCO + R'—OH → R—NHCOO—R'
R—NCO + R'—OH → R—NHCON—R—COO—R'
R—NCO + R'—NH$_2$ → R—NHCONHR'
R—NCO + R'—NH$_2$ → R—NHCONRCONH—R'
2R—NCO + H$_2$O → (R—NH)$_2$CO + CO$_2$

The mixing wt % of each component of the main agent is as shown in Table 2.

TABLE 2

| Component | wt % |
| --- | --- |
| Polyether polyol | 73.0 |
| Triethanolamine (hardening accelerator) | 0.6 |
| Dibutyltin dilaurate (hardening accelerator) | 0.7 |
| Low-molecular weight aromatic hydrocarbon (viscosity depressant) | 25.0 |
| Anti-oxidant | 0.7 |

The main agent and the hardening agent are mixed with each other and put in a mixing tank 15 immediately before the mixture of the sealing agent 10 is injected into the grommet 1 from a nozzle 17 through a pipe 16.

While the sealing agent 10 injected into the grommet 1 is flowing downward to the small-diameter cylindrical section 1a from the large-diameter section 1b of the grommet 1, the sealing agent 10 penetrates into the gaps between the adjacent groups of the electric wires (w) and the gaps between the groups of the electric wires (w) and the inner peripheral surface of the grommet 1. Because the viscosity of the sealing agent 10 is set to approximately 300 cps in a grommet-to-wire assembly environment, such as an environment that has a temperature of from about 10° C. to about 40° C., the sealing agent 10 has a high flowability. That is, the sealing agent 10 penetrates into the gaps smoothly even though they are narrow, thus filling the gaps completely.

Because the groups of the electric wires (w) are tied into a bundle tightly with the tape 12 to minimize the gaps therebetween. Consequently, it takes a considerable long period of time for the sealing agent 10 to reach the lower region of the grommet 1 from the grommet-installing region. Therefore, when the sealing agent 10 has reached the lower region of the grommet 1 after penetrating into the gaps, it changes from a solid into a gel, thus having a low degree of flowability. Accordingly, the sealing agent 10 is prevented from flowing downward from the grommet 1.

The sealing agent 10 filled in the gaps between the groups of the electric wires (w) and the gaps between the groups of the electric wires (w) and the inner peripheral surface of the grommet 1 gels in about five minutes and hardens completely in about 10 minutes, whereas it takes about 15 minutes for the conventional sealing agent to harden.

Figure 2:
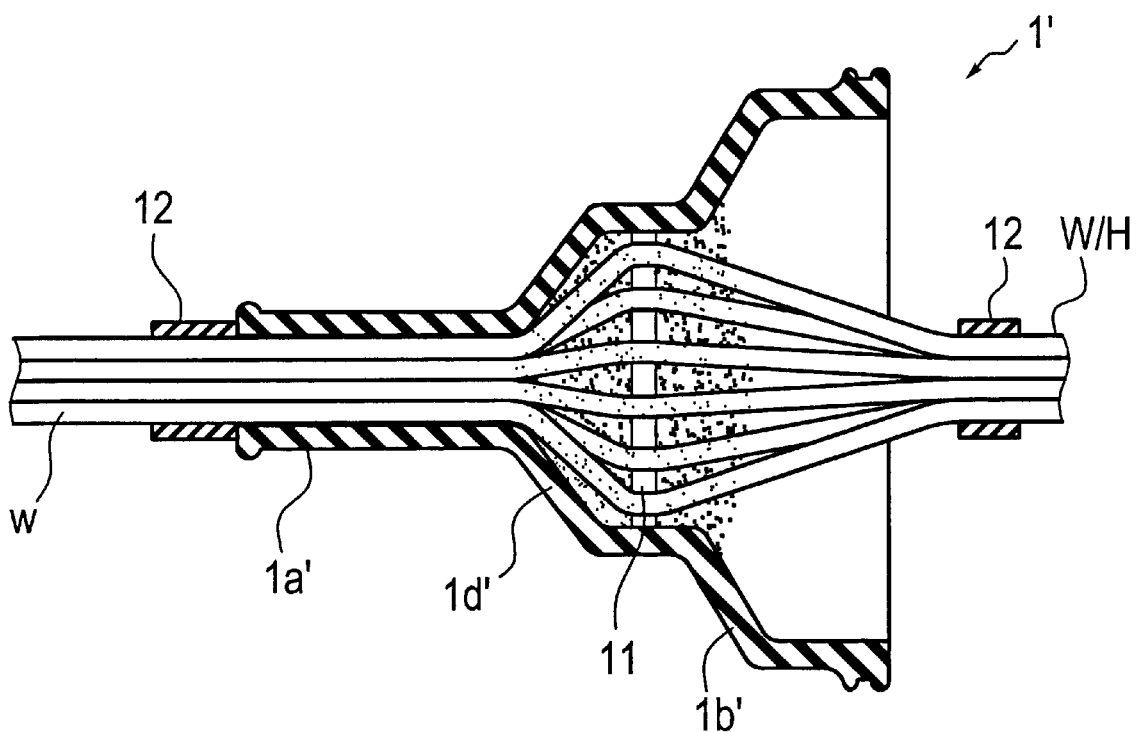
FIG. 2 is a sectional view showing a sealing construction of a wire harness at a grommet-installing part thereof according to a second embodiment.
Figure 3A:
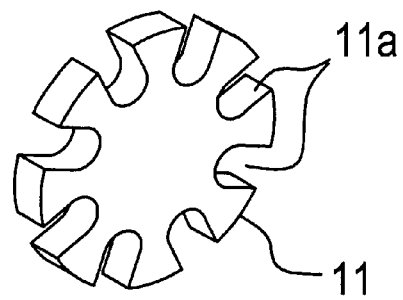
FIG. 3(A) is a perspective view showing a spacer usable with the second embodiment.
Figure 3B:
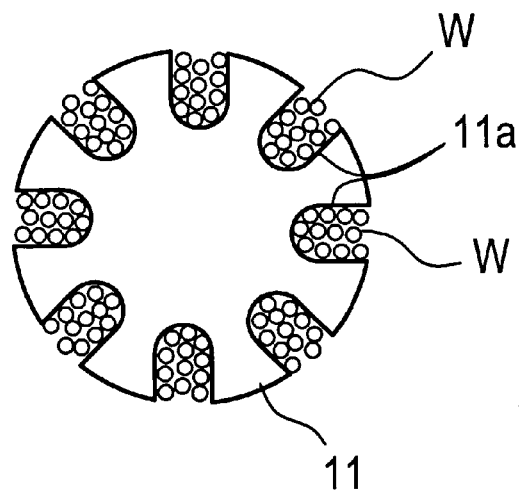
FIG. 3(B) is a front view showing the spacer on which electric wires (w) have been mounted.

FIGS. 2 and 3 show a second embodiment of the present invention. In the second embodiment, an intermediate-diameter cylindrical section 1d' is formed between a small-diameter section 1a' and a large-diameter section 1b' so that a spacer 11 is installed in close contact with the inner peripheral surface of the intermediate-diameter cylindrical section 1d'. The spacer 11 serves to form a large gap between adjacent groups of electric wires (w) of the wire harness W/H.

The spacer 11 is approximately disc-shaped and has a plurality of electric wire-insertion concaves 11a formed on the circumferential surface thereof at large regular intervals. That is, a plurality of groups of the electric wires (w) inserted through the electric wire-insertion concaves 11a of the spacer 11 are spaced at the large intervals. A tape 12 is wound around the spacer-installed wire harness W/H at both ends thereof in the electric wire-extended direction. Consequently, the intervals between the adjacent groups of the electric wires (w) become gradually smaller from the spacer-installed position toward both ends of the grommet 1' in the electric wire-extended direction.

The wire harness W/H held together with the spacer 11 is inserted into the grommet 1' and brought into close contact with the inner peripheral surface of the intermediate-diameter cylindrical section 1d'.

The spacer 11 distributes the groups of the electric wires (w) in the circumferential direction of the spacer 15 at large regular intervals, irrespective of the number of the electric wires (w) by adjusting its volume. Thus, the sealing agent 10 can be reliably filled into the large gaps between the groups of the electric wires (w). Thus, the wire harness W/H can be sealed reliably.

Figure 4:
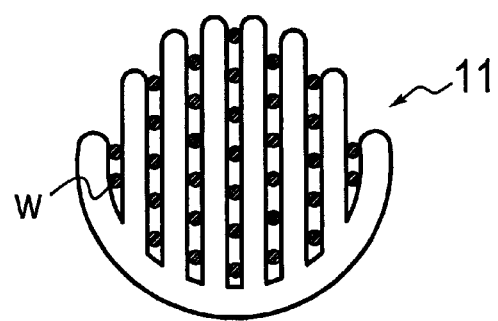
FIG. 4 is a front view showing a spacer on which electric wires (w) have been mounted.

As shown in FIG. 4, it is possible to use a comb-shaped spacer 11 to insert the electric wires (w) into spaces between adjacent teeth of the spacer 11. In this manner, gaps can be formed between adjacent groups of the electric wires (w) in the grommet 1.

For example, although an automotive wire harness assembly environment has been listed as a specific example of an environment in which this invention can be practiced, those skilled in the art will recognize other applicable environments of use, such as in the electronics industry. All such uses are also within the scope of this invention.

As apparent from the foregoing description, according to the present invention, the viscosity of the sealing agent is set to be lower than that of the conventional one to enhance its flowability. Thus, the sealing agent is capable of reliably penetrating into all the gaps between adjacent groups of electric wires and the gaps between the groups of the electric wires and the inner peripheral surface of the grommet, thus reliably waterproofing the grommet-installing part of the wire harness.

Further, the sealing agent has a high flowability and hardens in a shorter period of time than the conventional one. Thus, there is no possibility that the sealing agent flows downward from the grommet-installing region. In addition, because the sealing agent hardens in a shorter period of time, it takes a short period of time to install the wire harness on the grommet.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims.

What is claimed is:

1. A sealing agent to be filled into gaps between adjacent groups of electric wires and gaps between the groups of the electric wires and an inner peripheral surface of a grommet, the sealing agent being of a two-liquid reactive hardening type having a main agent and a hardening agent, said main agent containing a viscosity depressant and hardening accelerators mixed with each other at a predetermined ratio, wherein the sealing agent has a viscosity of about 200 cps to about 500 cps in a grommet-to-wire assembly environment and gels in about three to about seven minutes.

2. The sealing agent according to claim 1, wherein a mixing weight ratio between the main agent and the hardening agent is set to a range of about 5.5:1 to about 1:1;

the main agent includes polyether polyol, triethanolamine and dibutyltin dilaurate both used as the hardening accelerators, a low-molecular weight aromatic hydrocarbon used as the viscosity depressant, and an antioxidant; and the hardening agent includes polyisocyanate.

3. The sealing agent according to claim 1, wherein the grommet-to-wire assembly environment has a temperature of from about 10° C. to about 40° C.

4. A two-liquid reactive hardening type sealing agent for waterproofing an electric wire harness, comprising:

a main agent; and a hardening agent mixed with the main agent such that the sealing agent has a viscosity of about 200–500 cps in a grommet-to-wire assembly environment and a gel time of about 3–7 minutes.

5. The sealing agent according to claim 4, wherein the viscosity is about 300 cps and the gel time is about 5 minutes.

6. The two-liquid reactive hardening type sealing agent according to claim 4, wherein the grommet-to-wire assembly environment has a temperature of from about 10° C. to about 40° C.

7. A method for sealing a wire harness comprising:

mounting a large number of electric wires constituting the wire harness on a spacer that spaces groups of the electric wires at regular intervals;

inserting the wire harness into a grommet having a small-diameter section to be brought into close contact with a peripheral surface of the wire harness and a large-diameter section having a part to be mounted on a car body;

bringing the spacer installed on the wire harness into close contact with an inner peripheral surface of the grommet;

winding a tape around a leading end of the small-diameter section and the peripheral surface of the wire harness to fix the grommet to the wire harness at a predetermined position; and injecting a sealing agent having a main agent, a hardening agent, a viscosity of between about 200 cps to about 500 cps in a grommet-to-wire assembly environment and a gelling time in a range of about three to about seven minutes into the grommet from an opening positioned at an upper end of the large-diameter section, with the large-diameter section being turned at an upper side of the grommet to fill gaps between the groups of the electric wires and gaps between the groups of the electric wires and the inner peripheral surface of the grommet with the sealing agent.

8. The method according to claim 7, wherein a mixing weight ratio between the main agent and the hardening agent is in a range of about 5.5:1 to about 1:1.

9. The method according to claim 7, wherein the grommet-to-wire assembly environment has a temperature of from about 10° C. to about 40° C.

10. A sealing construction of a wire harness in which gaps between groups of electric wires and gaps between the groups of electric wires and an inner peripheral surface of a grommet are filled with a sealing agent, wherein the sealing agent is of a two-liquid reactive hardening type and includes a main agent and a hardening agent, said main agent containing a viscosity depressant mixed with hardening accelerators at a predetermined ratio, and wherein the sealing agent has a viscosity of about 200 cps to about 500 cps in a grommet-to-wire assembly environment and gels in about three to about seven minutes.

11. The sealing construction according to claim 10, wherein the grommet-to-wire assembly environment has a temperature of from about 10° C. to about 40° C.

12. A sealing construction for waterproofing a wire harness having a plurality of wires within a grommet, comprising:

a grommet body having a small-diameter section, a large-diameter section and a transition section between the small and large-diameter sections, said plurality of wires being closely spaced in the small-diameter section and separated in the large-diameter section; and a sealing agent disposed in said large-diameter section to fill gaps between the separated wires, said sealing agent having a viscosity in a range of about 200 cps to about 500 cps in a grommet-to-wire assembly environment, wherein the sealing agent includes a main agent and a hardening agent, the main agent including a viscosity depressant mixed in a predetermined ratio with hardening accelerator, and wherein the sealing agent hardens to fill the gaps between the separated wires.

13. The sealing construction according to claim 12, wherein a spacer that holds the wires is provided in at least one of the large-diameter section and the small-diameter section.

14. The sealing construction according to claim 13, wherein the spacer is a disc-shaped member provided with a plurality of circumferentially spaced concaves for receiving the separated wires.

15. The sealing construction according to claim 13, wherein the spacer is a comb-shaped member.

16. The sealing construction according to claim 12, further comprising tape provided adjacent the small-diameter section.

17. The sealing construction according to claim 12, further comprising a first piece of tape provided adjacent the small-diameter section and a second piece of tape disposed at an opposite side of the grommet body for regrouping the separated wires.

18. The sealing construction according to claim 17, further comprising a spacer that holds the wires, provided between the first and second pieces of tape.

19. The sealing construction according to claim 12, wherein the grommet-to-wire assembly environment has a temperature of from about 10° C. to about 40° C.

20. A method for constructing a waterproof grommet, comprising:

inserting a wire harness having a plurality of wires into a grommet body having a flared end;

injecting a sealing agent having a viscosity of between about 200 cps and about 500 cps in a gromment-to-wire assembly environment into the flared end; and gelling the sealing agent in a time period of about three to about seven minutes.

21. The method according to claim 20, further comprising:

taping the wires in tight groupings on each end of the grommet body; and separating the wires in the flared section using a spacer element.

22. The method according to claim 20, wherein the grommet-to-wire assembly environment has a temperature of from about 10° C. to about 40° C.

23. A sealing construction for waterproofing a wire harness having a plurality of wires within a grommet, comprising:

a grommet body having a small-diameter section, a large-diameter section and a transition section between the small and large-diameter sections, said plurality of wires being closely spaced in the small-diameter section and separated in the large-diameter section; and a sealing agent disposed in said large-diameter section to fill gaps between the separated wires, said sealing agent having a viscosity in the range of about 200 cps to about 500 cps in a grommet-to-wire assembly environment, wherein the sealing agent has a gelling time in the range of about 3 to about 7 minutes, and hardens to fill that gaps between the separated wires.

24. The sealing construction according to claim 23, wherein the grommet-to-wire assembly environment has a temperature of from about 10° C. to about 40° C.

\* \* \* \* \*